United States Patent Office 3,712,930
Patented Jan. 23, 1973

3,712,930
PROCESS FOR POLYMERIZATION OF
TETRAHYDROFURAN
Kazuo Matsuda, Yakayama, Yoshiaki Tanaka, Osaka, and Takeyo Sakai and Ichiro Iwasa, Wakayama, Japan, assignors to Kao Soap Co., Ltd., Tokyo, Japan
No Drawing. Filed Feb. 24, 1970, Ser. No. 13,839
Claims priority, application Japan, Mar. 3, 1969,
44/15,932
Int. Cl. C07c 41/00, 43/02
U.S. Cl. 260—615 B                                6 Claims

ABSTRACT OF THE DISCLOSURE

Tetrahydrofuran is polymerized in the presence of a catalyst of fuming sulfuric acid containing from 15–43 wt. percent of $SO_3$. The amount of the catalyst is in the range of 10–40 parts by weight of catalyst per 100 parts by weight of tetrahydrofuran. The polymerization temperature is in the range of from $-40°$ C. to about $+100°$ C.

---

The present invention relates to a novel process for the polymerization of tetrahydrofuran. More particularly, it relates to a process for the ring-opening-polymerization of tetrahydrofuran in the presence of fuming sulfuric acid of an $SO_3$ concentration in the range of from about 15 wt. percent to about 43 wt. percent as a catalyst.

The polymerization of tetrahydrofuran in the presence of a cationic polymerization catalyst such as a Lewis acid or strong acid has been well known. The polyethers thus obtained are in the state of a liquid, wax or resinous solid according to their degree of polymerization. However, in order to obtain a polymer having hydroxyl radicals at both terminal ends of the polymer molecule, it is necessary to completely hydrolyze the radicals such as chloride, acetyl ester, etc. at the terminal ends of the polymer molecule into hydroxyl radicals after the polymerization has been stopped by the addition of water. For this hydrolysis, strong reaction conditions are required, which will make the reaction procedure complex. In case fluorosulfuric acid is used as a catalyst, polyethers having hydroxyl radicals at both ends of the polymer molecule can be obtained easily by performing the hydrolysis in an acidic condition, but the coexistence of hydrofluoric acid is undesirable in view of the material for constructing the reaction apparatus, since it will require a very expensive material. Further, in German Pat. No. 766,208, a process is disclosed wherein tetrahydrofuran is polymerized in the presence of 45 wt. percent fuming sulfuric acid. However, the polymerization process of said German patent will cause partial carbonization and severe coloring of the resulting polymers and the decolorization of the polymer by various after-treatments is impossible or very difficult. Thus, the resulting polymers are of no practical use.

We have made various experiments in order to overcome the above defects of the prior art processes and found that very colorless tetrahydrofuran polymers can be prepared easily and economically through a far simpler reaction procedure and by using a more inexpensive reaction apparatus than the conventional ones by using fuming sulfuric acid of an $SO_3$ concentration in the range of from about 15 wt. percent to about 43 wt. percent as the polymerization catalyst.

If fuming sulfuric acid of an $SO_3$ concentration above 43 wt. percent is used, severe carbonization and coloring of the polymers will occur and the decoloration of the polymer is substantially impossible by any after-treatment. In particular, if 45 wt. percent fuming sulfuric acid, which corresponds to pyrosulfuric acid ($SO_3 \cdot H_2SO_4$), is used, tarlike carbonaceous substances will be produced and the removal of such carbonaceous substances is very difficult due to their tarlike nature. Thus, polymers having very bad color will be obtained.

If fuming sulfuric acid of an $SO_3$ concentration below 15% is used, the polymerization yield would become usually as low as 30%, though it will somewhat depend on the polymerization temperature. Thus, this is not practical even if the non-reacted monomer is recovered and reused.

In carrying out the process of the present invention, 28 wt. percent fuming sulfuric acid or 23 wt. percent fuming sulfuric acid, which is industrially easily available, is advantageously used. There is observed a tendency that the yield of the polymer is lowered as the $SO_3$ concentration is reduced.

The amount of the catalyst to be used in the process of the present invention will be varied according to the concentration of fuming sulfuric acid and a polymerization temperature, but, in general, the high yield of the polymer may be obtained with 10–40 parts (parts are by weight, here and hereinbelow) of the catalyst per 100 parts of the tetrahydrofuran monomer, and the maximum average molecular weight of the polymer will be obtained with 20–30 parts of the catalyst per 100 parts of the monomer.

The polymerization reaction is performed by contacting tetrahydrofuran with the catalyst in the presence of a solvent (solution polymerization) or in the absence of a solvent (bulk polymerization).

The polymerization solvent can be used in case of need, though the polymerization velocity will be lowered in general in the presence of a polymerization solvent. As the polymerization solvent, there may be used those solvents which will give no remarkably unfavorable influence on the polymerization such as aliphatic hydrocarbons, alicyclic hydrocarbons, halogenated hydrocarbons and ethers, which include, for example, hexane, cyclohexane and 1,2-dichloroethane. As to the quantity of the solvents, there exists no critical limitation.

The polymerization is carried out in general in a nitrogen-replaced and sealed reaction vessel, but it may be carried out also in an open reaction system if the incoming of humidity can be prevented.

The polymerization temperature can be selected in the range of from about $-40°$ C. to about $100°$ C., but a temperature of from about $-20°$ C. to about $10°$ C. is preferable. Generally, the higher is the temperature, the darker is the color of the polymer.

The fractional purification of the polymer products in the bulk polymerization of tetrahydrofuran according to the process of the present invention can be performed as follows: After stopping the polymerization by the addition of water, the reaction mixture is heated to recover the non-reacted monomer therefrom and then it is further heated to keep the temperature of the mixture in the range of 90–100° C., thereby completing the hydrolysis of the sulfuric acid ester radicals at the terminal ends of the polymer. Then, the reaction mixture is allowed to cool so as to separate the polymer products having terminal hydroxyl groups at both ends of the polymer molecules as the upper oil layer, collecting the oil layer and subjecting the same to neutralization, dehydration and desalting steps to obtain purified polymer products. The recovered non-reacted monomer can be circulated to the reaction vessel and reused.

The polymers obtained according to the process of the present invention are in the form of colorless liquid or waxy solid which can be used as a polyol for the preparation of polyurethane.

The process of the present invention will be illustrated below by way of examples and comparative examples.

EXAMPLE 1

In a 300 ml. four-necked flask provided with a stirrer, a thermometer, a reflux condenser and a dropping funnel, 100 parts of tetrahydrofuran are charged. External ice-cooling is effected and a nitrogen blanket is maintained. Under sufficient stirring and keeping the temperature between 0–5° C., 27 parts of 28% fuming sulfuric acid are added dropwise through the dropping funnel over a period of one hour. Since this is a quite violent exothermic reaction, care should be taken in the addition of the catalyst so as to avoid over-heating by means of sufficient stirring and cooling. The occurrence of the polymerization can be recognized since the viscosity of the reaction mixture increases near the completion of the dropping.

After completion of the dropping, the aging of the reaction mixture is effected by stirring at 0° C. for one hour. Thereafter, 200 parts of water are added to stop the polymerization reaction. A dehydration tube is attached to the reflux condenser and, under stirring, the temperature is raised by means of a water bath and the non-reacted monomer is recovered through the dehydration tube. The heating is continued at 90–100° C. for an additional two hours under stirring to effect the hydrolysis of the terminal end radicals of the polymer. The water bath is taken away and the reaction mixture is allowed to cool whereby the reaction mixture separates into two layers. The upper oil layer is separated and the sulfuric acid contained therein is neutralized. After the dehydration and desalting treatments, 53.8 parts of purified terminal diol-polyethers having hydroxyl radicals at both ends of the polymer molecules are obtained. Results of the analysis of the obtained polymer are as follows:

Average molecular weight calculated from terminal OH radical _____ 1004
Average molecular weight determined according to vapor pressure depression method _____ 980
Color (APHA) _____ 10

EXAMPLE 2

According to substantially the same procedure as in Example 1, 62.2 parts of the purified polyether glycol are obtained by using 27 parts of 40% fuming sulfuric acid per 100 parts of tetrahydrofuran. Results of the analysis of the obtained polymer are as follows:

Average molecular weight calculated from terminal OH radical _____ 849
Average molecular weight determined according to vapor pressure depression method _____ 840
Color (APHA) _____ 10

EXAMPLE 3

According to substantially the same procedure as in Example 1, 50.0 parts of purified polyether glycol are obtained by using 30 parts of 23% fuming sulfuric acid per 100 parts of tetrahydrofuran. Results of the analysis of the obtained polymer are as follows:

Average molecular weight calculated from terminal OH radical _____ 998
Average molecular weight determined according to vapor pressure depression method _____ 975
Color (APHA) _____ 10

EXAMPLE 4

According to substantially the same procedure as in Example 1, 61.5 parts of the purified polyether glycol are obtained by using 27 parts of 42% fuming sulfuric acid per 100 parts of tetrahydrofuran. Results of the analysis of the obtained polymer are as follows:

Average molecular weight calculated from terminal OH radical _____ 878
Color (APHA) _____ 50

EXAMPLE 5

According to substantially the same procedure as in Example 1, 62.1 g. and 46.0 g. of purified polyether glycols are respectively obtained by using 27 g. and 17.6 g. of 43% fuming sulfuric acid (the $SO_3$ content of the latter is the same as the $SO_3$ contents of 27 g. of 28% fuming sulfuric acid) per 100 g. of tetrahydrofuran. Results of the analysis of the obtained polymers are as follows:

|  | The amount of 43% fuming sulfuric acid used | |
|---|---|---|
|  | 27 g. | 17.6 g. |
| Average molecular weight calculated from terminal OH radical | 866 | 996 |
| Color (APHA) | 100 | 100 |

In a 500 ml. four-necked flask provided with a stirrer, a thermometer, a reflux condenser and a dropping funnel, 100 parts of tetrahydrofuran and 30 parts of 1,2-dichloroethane as the solvent are charged. External cooling of the flask is effected under sufficient stirring and 34 parts of 28% fuming sulfuric acid are added dropwise through the dropping funnel over a period of one hour while maintaining the temperature of the mixture below −5° C. After the completion of the dropping, the aging of the reaction mixture is effected by stirring at −5° C. to −4° C., for 5 hours. The viscosity of the system after the completion of the aging step is about 500 cp., while, if the solvent is not used, the viscosity of the system will rise to over 4,000 cp. Thereafter, 200 parts of water are added to stop the polymerization reaction. A dehydration tube is attached to the reflux condenser and, under stirring, the temperature is raised by means of a water bath and the non-reacted monomer (tetrahydrofuran) and 1,2-dichloroethane are recovered through the dehydration tube. The heating is continued at 90–100° C. for additional two hours under stirring to effect the hydrolysis of the terminal end radicals of the polymer. Then, the purification step of the polymer is conducted according to substantially the same procedure as in Example 1 and 55.0 parts of the purified polyether glycol are obtained. Results of the analysis of the obtained polymer are as follows:

Average molecular weight calculated from terminal OH radical _____ 816
Average molecular weight determined according to vapor pressure depression method _____ 810
Color (APHA) _____ 10
Chlorine content _____ 0

COMPARATIVE EXAMPLE 1

In a 300 ml. four-necked flask provided with a stirrer, a thermometer, a reflux condenser and a dropping funnel, 100 parts of tetrahydrofuran are charged. External ice-cooling is effected and a nitrogen blanket is maintained. Under sufficient stirring and keeping the temperature between 0° C. to 5° C., 27 parts of 45% fuming sulfuric acid are added dropwise through the dropping funnel over a period of about one hour. Since this is a quite violent exothermic reaction, care should be taken in the addition of the catalyst so as to avoid overheating by means of sufficient stirring and cooling. Simultaneously, with the start of the dropping of 45% fuming sulfuric acid, the partial carbonization of the reaction mixture takes place and the incrustation of the inner wall of the flask with carbonaceous substances is observed. The color in the reaction system changes to black. The occurrence of the polymerization can be recognized, since the viscosity of the reaction mixture increases near the completion of the dropping. After the completing of the dropping, the aging of the reaction mixture is effected by stirring at 0° C. for one hour.

Thereafter 200 parts of water are added to stop the polymerization reaction. A dehydration tube is attached to the reflux condenser and, under stirring, the temperature is raised by means of a water bath and the non-reacted monomer tetrahydrofuran is recovered through the dehydration tube. The heating is continued for an additional two hours at 90–100° C. under stirring to effect the hydrolysis of the terminal end radicals of the polymer. The water bath is taken away and the reaction mixture is allowed to cool whereby the reaction mixture separates into two layers. Both upper and lower layers are black-brown in color. The upper oil layer is separated and the sulfuric acid contained therein is neutralized. After the dehydration and desalting treatments, 45.3 parts of purified polyethers having hydroxyl radicals at both ends of the polymer molecules are obtained. In addition, 4.9 parts of carbonaceous substances are collected. Results of the analysis of the obtained polymer are as follows:

Average molecular weight calculated from terminal
  OH radical _____ 1427
Color (Gardner) _____ 11

The polymer products cannot be used as the starting materials for the preparation of a polyurethane, since a color below 100 (APHA) is required for the preparation of a polyurethane.

COMPARATIVE EXAMPLE 2

According to substantially the same procedure as in Comparative Example 1, the reaction is carried out by using 27 parts of 50% fuming sulfuric acid per 100 parts of tetrahydrofuran. 47.7 parts of purified polyether glycol are obtained. 8.0 parts of carbonaceous substances are obtained. Results of the analysis of the obtained polymer are as follows:

Average molecular weight calculated from terminal
  OH radical _____ 1029
Color (Gardner) _____ 6

The fact that the color of the polymer obtained in this comparative example wherein 50% fuming sulfuric acid is used is better than that in comparative Example 1 wherein 45% fuming sulfuric acid is used is considered to be due to the fact that the carbonization in this Comparative Example 2 is severe and the carbonaceous substances are burnt completely and consequently the separation of said carbonaceous substances in the successive filtration step is effected well. However, the quantity of the by-produced carbonaceous substances are higher in the case of using 50% fuming sulfuric acid.

What we claim is:

1. A process for the polymerization of tetrahydrofuran, which comprises polymerizing tetrahydrofuran at a temperature in the range of −20° C. to +10° C., in the presence of from 10 to 40 parts by weight, per 100 parts of tetrahydrofuran, of fuming sulfuric acid containing from 15 to 43 wt. percent of $SO_3$ as a catalyst until a polymer is formed; then adding water to the reaction mixture to stop the polymerization; raising the temperature of the reaction mixture to recover non-reacted tetrahydrofuran therefrom and then maintaining said reaction mixture at a temperature of 90 to 100° C. to complete the hydrolysis of the sulfuric acid ester radicals of the polymer at both ends of the polymer molecules; cooling the mixture to separate the polymer having terminal hydroxyl groups at both ends of the molecule as an upper oil layer; collecting the oil layer and subjecting same to neutralization, dehydration and desalting steps to obtain the purified polymer.

2. The process as claimed in claim 1, wherein 23 wt. percent or 28 wt. percent fuming sulfuric acid is used.

3. The process as claimed in claim 1, wherein the polymerization reaction is carried out in the absence of a solvent.

4. The process as claimed in claim 1, wherein the polymerization reaction is carried out in the presence of a solvent selected from the group consisting of aliphatic hydrocarbons, alicyclic hydrocarbons, halogenated hydrocarbons and ethers.

5. The process as claimed in claim 4, wherein said solvent is 1,2-dichloroethane.

6. The process as claimed in claim 1, wherein the amount of said catalyst is 20–30 parts by weight per 100 parts of tetrahydrofuran.

References Cited

UNITED STATES PATENTS 3,358,042   12/1967   Dunlop et al. _____ 260—615 B
2,751,419   6/1956    Hill et al. _____ 260—615 B

FOREIGN PATENTS 766,208   6/1953   Germany _____ 260—615 B

HOWARD T. MARS, Primary Examiner